INVENTORS.
ROBERT G. HINDMAN,
JOHN J. BARDGETTE,

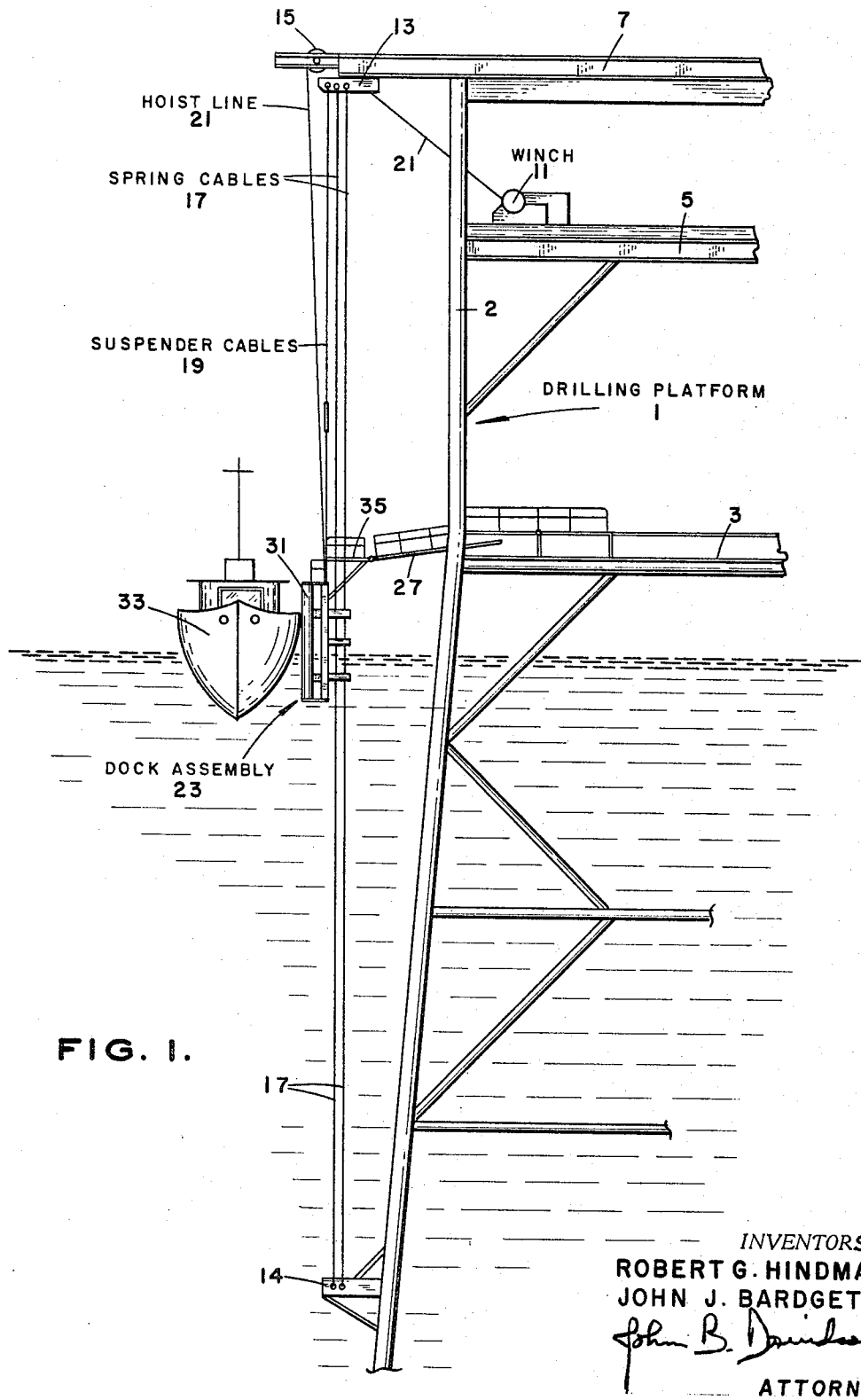

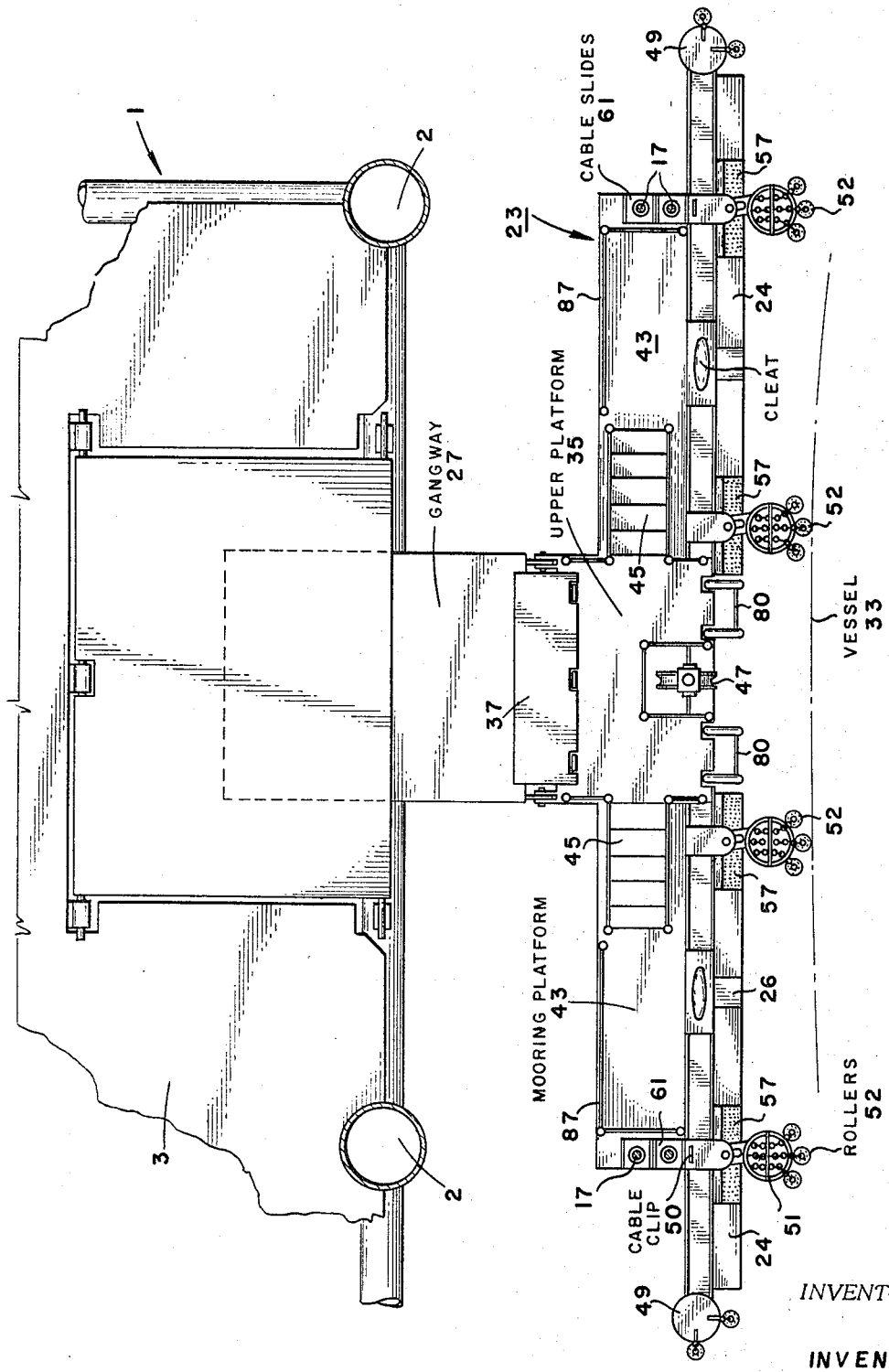

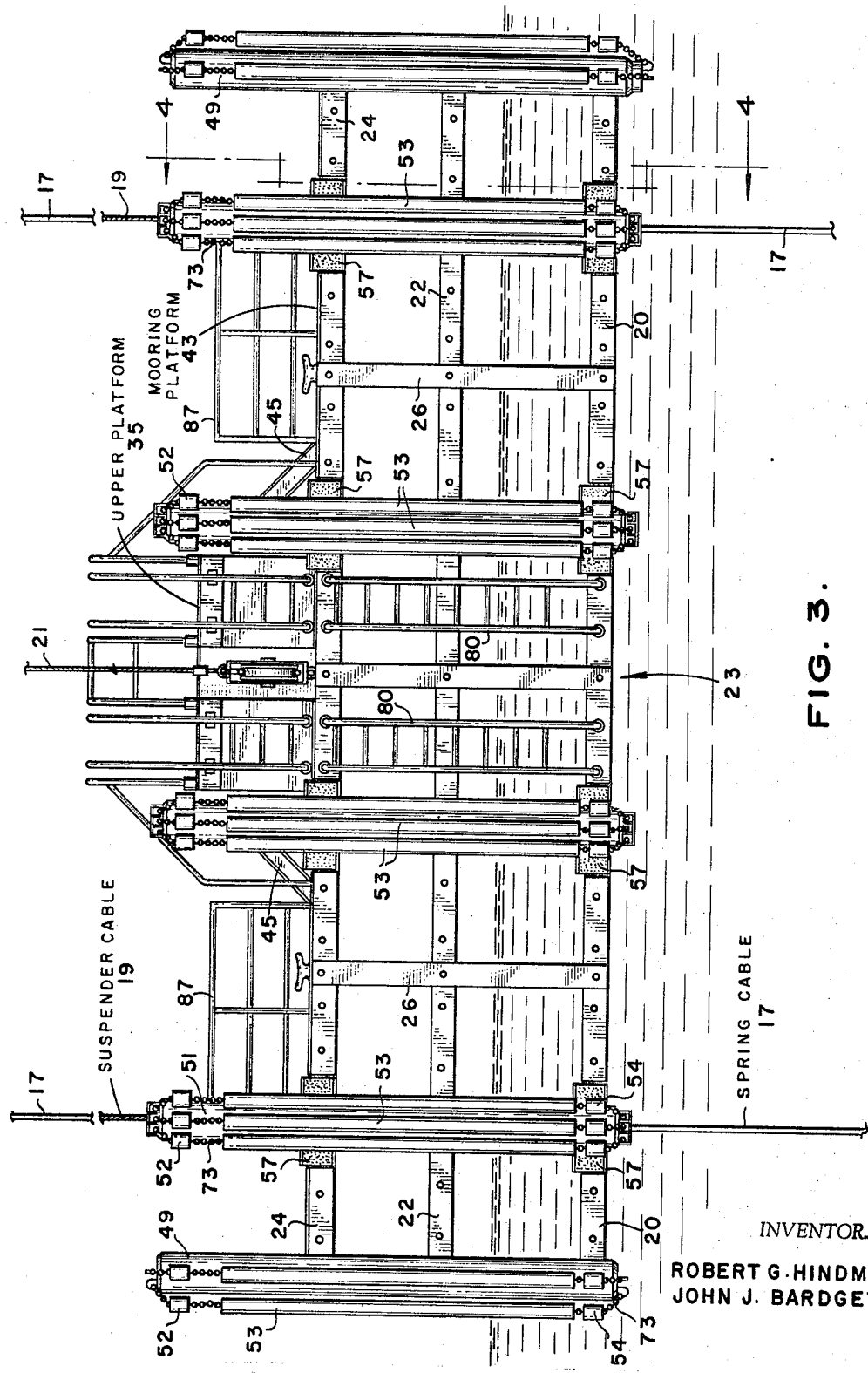

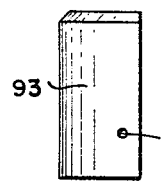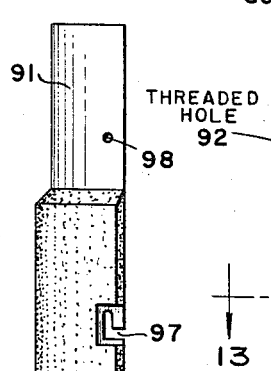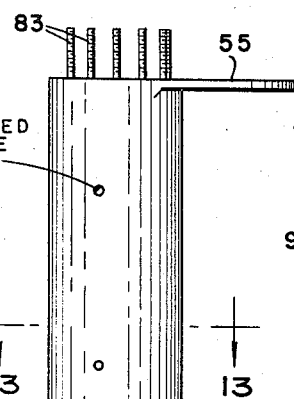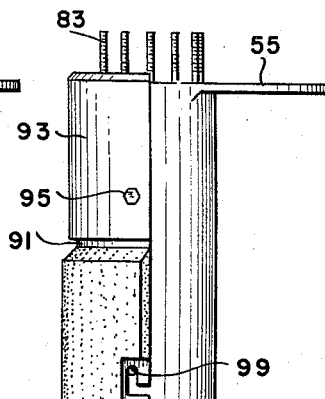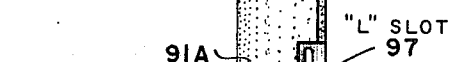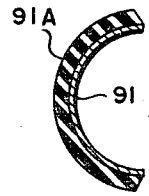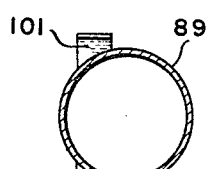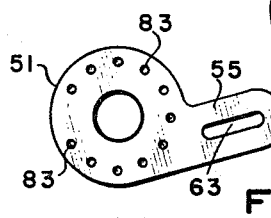

United States Patent Office 3,373,713
Patented Mar. 19, 1968

3,373,713
APPARATUS FOR USE WITH OFFSHORE MARINE STRUCTURES
Robert G. Hindman and John J. Bardgette, New Orleans, La., assignors, by mesne assignments, to Esso Production Research Company, Houston, Tex., a corporation of Delaware
Filed Mar. 15, 1965, Ser. No. 439,688
8 Claims. (Cl. 114—220)

ABSTRACT OF THE DISCLOSURE

Apparatus for fending off vessels from a marine structure uses a sheath of rubberlike material fixed to a cylindrical base member by pins on the base member and L-shaped slots in the sheath. The structure may include elongated cylindrical members suspended around the sheathed member in spaced relationship therewith.

This invention relates to the art of docking vessels alongside marine structures for the purpose of transferring personnel and equipment to and from the structure, and more particularly to docking apparatus for use with offshore marine structures where wave action makes transfer of personnel and equipment quite dangerous and difficult.

A number of different types of apparatuses and equipment have been developed in the past for the purpose of facilitating the transfer of personnel and equipment to and from marine structures where high wave action is apt to seriously interfere with such transfer. Generally speaking, such apparatuses have been unsatisfactory from a safety viewpoint, or have been so complex that they have not found acceptance. One particularly serious problem has been that forces directed against fenders, such as dolphins and bumpers, are exerted in many directions, and prior art fender systems simply have not been able to compensate for the forces exerted thereon from all directions. Another problem has been that it has been difficult to compensate for the effects of tides; the docking apparatus often has been too high or too low for bringing boats alongside the structure at all times of the day and night. No really effective apparatus has been available for compensating for the effects of tides. Still another deficiency in prior art apparatuses is that the assembly of dolphins and bumpers comprising rubber sheaths on rigid base members has been expensive, difficult, and generally result in unsatisfactory structures. Failure of the rubber sheaths has occurred as the result of prior art attachment methods, and replacement procedures generally are quite costly.

Objects and features of the invention not apparent from the above discussion will become evident upon consideration of the following detailed description of the invention taken in connection with the accompanying drawings, wherein:

FIG. 1 is a simplified side view of an off-shore structure making use of the invention illustrating a boat being brought alongside the structure;

FIG. 2 is a more detailed top view of a dock formed in accordance with the invention wherein use is made of the invention in its several aspects;

FIG. 3 is a detailed side view of a dock formed in accordance with the invention;

FIG. 7 is an elevational view of a base member used in the construction of a dolphin illustrated in the preceding figures;

FIG. 8 is a view of a sheath to be placed on the dolphin hown in FIG. 7;

FIG. 9 is a view of a cap member to be used in holding the sheath of FIG. 8 on the dolphin shown in FIG. 7;

FIG. 10 is a view of the sheath and cap member of FIGS. 8 and 9 on the base member of FIG. 7;

FIG. 11 is a top view of the cap member of FIG. 9;

FIG. 12 is a top view of the base member of FIG. 7;

FIG. 13 is a sectional view taken along section 13—13 of FIG. 7;

FIG. 14 is a sectional view taken along section 14—14 of FIG. 7; and

FIG. 15 is a sectional view taken along section 15—15 of FIG. 8.

Figure 5:
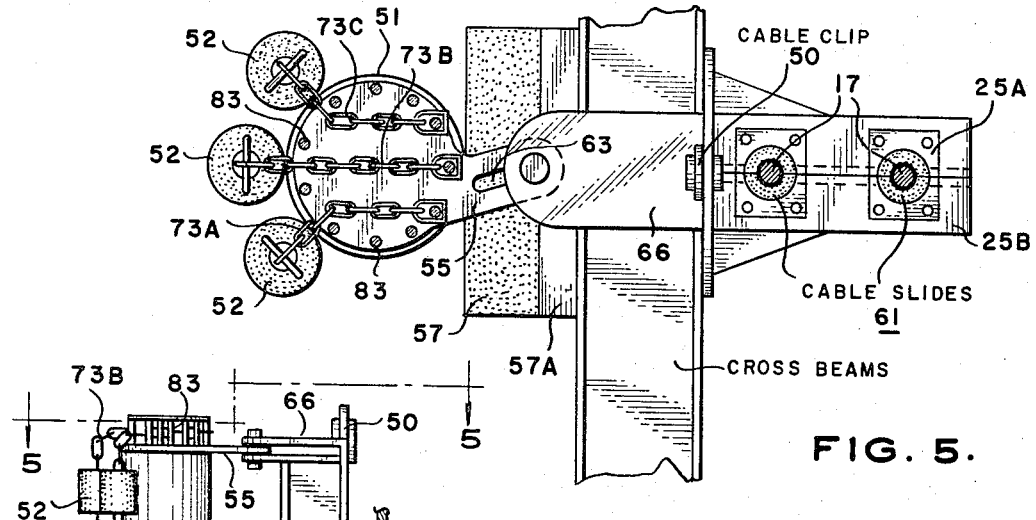
FIG. 5 is an enlarged top view of a portion of the apparatus of FIG. 4.

With reference now to FIG. 1, there is shown a drilling platform structure 1 having a plurality of substantially vertical legs, one of which is designated by the reference numeral 2. The legs are interconnected by plurality of work decks or platforms 3 and 5 and by braces 9. A top beam 7, which also interconnects the legs of the structure 1, additionally serves as a support for a sheave 15 and a cable end tieplate 13. Deck 3 serves as a boarding platform to which personnel and equipment are transferred from a dock structure 23 which is suspended alongside the drilling structure. Personnel and equipment are initially transferred from small boats 33 to an upper dock platform 35, and, from there to platform 3 by means of a gangway 27 hingedly supported on upper platform 35. Dock 23 is substantially rectangular in shape and is supported endwise from the drilling platform structure 1 by means of a cable system including spring cables 17 at opposed vertical ends of the dock and suspender cables 19 in front of the spring cables. A hoisting cable 21 is connected at about the center of the dock structure and extends to a winch 11 on work deck 5 through a sheave system 15 supported on top brace member 7. A fender system 31, described in greater detail below, prevents boats coming alongside from damaging the dock structure by absorbing the impact of the boats produced as the result of wave action and the unavoidable forces attendant on boats coming alongside any dock. The spring cables 17 are connected between top and bottom cable end tieplates 13 and 14. The suspender cables 19 are connected to the top cable end tieplate 13.

In FIGS. 2 and 3 are illustrated details of construction of the dock structure. As indicated above, the dock structure is substantially rectangular in shape and is supported endwise in the water from the drilling platform. The mooring platform or deck 43 of the dock is supported by a number of horizontal beams, one of which is designated by the reference numeral 24. The dock also includes other horizontal beams designated by the reference numerals 20 and 22, and by a plurality of vertical beams 26 interconnecting the horizontal beams to form a rigid structure. The upper platform 35 of the dock serves as the boarding platform and at least one, and preferably two or more, ladders 80 extend from beneath the water line to the level of the upper platform to facilitate transfer of personnel from boats of all sizes coming alongside the dock. Stairways 45 are provided between the mooring platform 44 and the upper platform 35. Guard rails 87 are provided on the mooring platform 43 and the upper platform 35 for safety purposes. Hoisting cable 21 is tied to a conventional block 47 which is affixed at substantially the center of the dock. Spring cables 17 extend through each end of the dock at the levels of each of horizontal beams 20, 22, and 24 and are frictionally engaged by cable slides 61 near the ends of the dock. The details of construction of the tension cable clamp are illustrated most perspicuously in FIGS. 4 and 5. A plurality of cleats on the mooring platform 43 are provided to which ropes or lines from boats may be tied. The gangway 27 hingedly supported at the level of upper platform 35 extends to the platform deck of the drilling structure 1. A short auxiliary gangway member 37, also hingedly supported on upper platform 35, extends from the upper platform 35 to the hinged gangway 27 so as to provide a continuous gangway by bridging the gap between the platform 35 and the gangway 27. The suspension cables 19 are tied to the dock 23 by means of clips 50, which are secured to the upper end of the two outermost beams 28 in a manner most perspicuously illustrated in FIGS. 4 and 5. The vertical beams 28 also support a plurality of fenders at the ends and along the side of the dock which extend from about the level of horizontal beam 20 to above the level of the platform 35. The fenders are hingedly or pivotally supported by a construction that will be described in detail below. Back-up bumpers 57, which are formed of rubber or rubberlike material, are affixed to the dock immediately behind the fenders for the purpose of absorbing the shock of the fenders on the dock when the fenders are pushed against the dock by a boat coming alongside. The bumpers 57 are positioned immediately behind the fenders and may be formed of blocks of rubber several feet long and of substantially square cross-section, and about one foot along an edge. The bumpers are affixed to the dock by bolts 57B extending into a bore therein and flanges 57A (see FIG. 4).

Figures 4, 6:
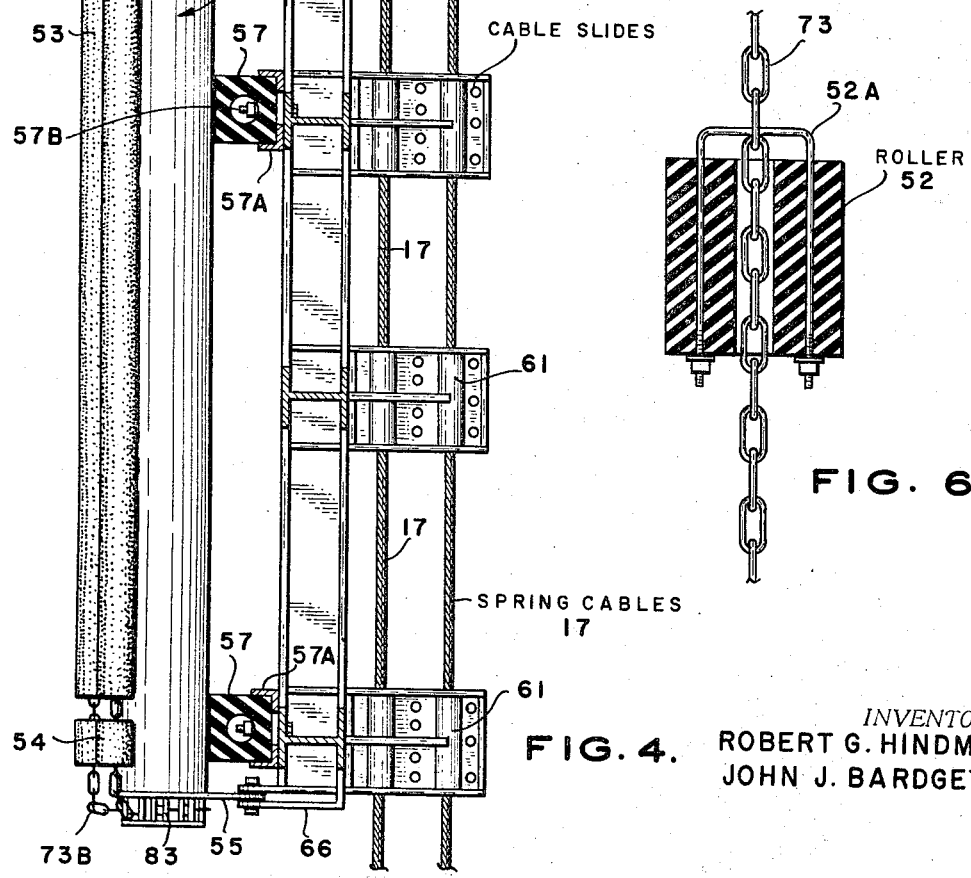
FIG. 4 is an enlarged side view of one of the fenders illustrated in FIG. 3 along with a portion of the support apparatus therefor.
FIG. 6 is an enlarged top view of one of the enlarged top rollers of FIGS. 4 and 5, showing certain of the constructional details thereof.

The construction of the fenders and the manner in which the fenders are connected to the dock is illustrated most perspicuously in FIGS. 4, 5, and 6, along with the apparatus by means of which the tension cables 17 and suspension cables 19 are connected to the dock. The fenders each comprise a vertically disposed, cylindrically-shaped dolphin member having a diameter between 16 and 30 inches, and a plurality of bumpers constructed of rubberlike material having a length that is several feet shorter than the length of the dolphin to which they are attached. The fenders 53 bear against the dolphins 51 and are substantially parallel thereto. The dolphins have top and bottom members including arms 55 extending laterally therefrom, each having a slot 63 therein to permit pivotal attachment to the dock. Horizontally disposed fender support members 66 are connected to vertical beams 28 and have pins therein for the purpose of engaging the slots 63 so as to provide a pivotal support attachment for the fenders. At each end of each of the dolphin members is a cage comprising a plurality of vertically extending bolts projecting from the ends of the dolphin members. The purpose of the cage is to provide a guide to circumferentially position the bumpers 53 around the circumference of the dolphins 51. A cable means, such as chain 73, extends through each of the bumpers 53 (the bumpers being of annular cross-section so that a longitudinal bore extends therethrough), which chains are affixed to one of the bolts at each end of a dolphin and which extend across the top and bottom of the dolphin, as shown best in FIG. 5, so as to position the bumper supported thereby at its appropriate position on the surface of the dolphin associated therewith. Roller members 52 and 54 above and below each bumper 53 are for the purpose of limiting vertical movement of the bumper. The rollers are of substantially the same diameter as the bumper and, also, may be formed of rubber or rubberlike material. The construction of the top and bottom rollers 52 and 54 is best illustrated in FIG. 6, along with the means for positioning the rollers on the chain. As illustrated, a U-shaped member 52A is provided which has its crossover portion extending through a link of a chain 73 and having its legs extending vertically through the roller member associated therewith. Nuts and lock washers at the ends of the U-shaped member hold the roller on the U-shaped member.

The clips 50, to which the suspender cables are connected, are affixed to vertical beams 28 at the back side of the upper end thereof. The clips 50 may be welded or bolted to the vertical beams 28. The slides 61 engaging the spring cables 17 are each formed in two pieces which bolt together, and also bolt to the horizontal beam members 20, 22, and 24 near each end of the dock. The slides have semicylindrical bores therethrough for forming a composit bore to accommodate cables 17 and to engage the cables when the bolts connecting the pieces together are tightened. Each of the tension cable slide members 25A and 25B has a pair of semicylindrical bores extending therethrough so that the cables may be held between the slide members 25A and 25B. The cable slides 61 extend a distance toward the drilling platform 1 away from the dock 23 so that the tension cables 17 will have free clearance and will not strike any of the upper portion of the dock structure.

The details of construction of each of the dolphin members 51 is illustrated in FIGS. 7-15. The dolphin is constructed of a substantially cylindrical steel base member, illustrated in FIG. 7, to which is affixed a curved metal member 91, to which is bonded a sheath member 91A of the rubberlike material, illustrated in FIG. 8, by means of a clamping cap member 93 illustrated in FIG. 9. The cylindrical base member 89 has a plurality of vertically spaced-apart threaded pins 99 affixed thereto and extending outwardly therefrom. Near the lower end thereof is a saddle flange 101 which extends outwardly and then upwardly so as to form a support saddle for the curved sheath member 91. A plurality of bolts 83 extend above and below the cylindrical base member and are affixed thereto to form the cage previously described. Arms 55 (see FIGS. 7, 12, and 19) extend outwardly from the cylindrical base member and may be integral therewith to form a pivotal connection, also described above. The curved member 91 is provided with a slot 103 in the lower end thereof so that curved member 91 engages and straddles the saddle flange 101. A plurality of L-shaped slots 97 are provided along the length of the curved member 91 for engaging the threaded pins 99 to hold the sheath on the cylindrical base member. The sheath is also held on the cylindrical base member by the cap member 93 illustrated most perspicuously in FIGS. 9 and 11. The cap member conforms to the curvature of the upper portion of the curved member 91 and also has a flange 94 with a plurality of holes therein permitting the flange 94 to be slid over the bolts 83 so as to hold the cap member firmly in place on the cylindrical base member 89. The cap member 93, the curved member 91, and the cylindrical base member 89 also are provided with matching threaded holes 96, 98, and 92 for accommodating a bolt to additionally hold the three members together. The curved member preferably is semi-cylindrical in shape, as is illustrated in FIG. 15. The dock structure 23, as shown, is also provided with a cylindrical bumper member 49 on each end thereof for added protection.

The dock is lifted or lowered into position by means of winch 11 and hoisting cable 21. With the cable clamps 61 somewhat loose, the spring cables 17 are affixed to cable end tieplates 13 and 14. The suspension cable 19 also is secured at this time. The tension cable slide sections 25A and 25B are thereupon bolted together so that the entire fender assembly is free to slide up and down on the cables. When a boat comes alongside, the bumpers 53 and the dolphin 51 permit forces exerted in almost any direction to be readily absorbed by the fender system. The bumpers 53 have a limited amount of vertical movement so that vertical forces can be absorbed. The dolphin can pivot against the bumper 57 so that horizontal forces acting thereon can be readily absorbed. The dock itself can be lifted to some extent by the boat so that relative movement therebetween is minimized even in heavy seas.

Having described the principle of the invention, and the best mode in which I have contemplated applying that principle, I wish it to be understood that the apparatus described is illustrative only and that other means can be employed without departing from the true scope of the invention as defined in the following claims.

What is claimed is:
1. A dolphin or bumper for use on marine structures for fending off vessels, comprising:
   a substantially cylindrical base member;
   a plurality of vertically spaced-apart pins affixed to and extending outwardly from said base member;
   at least one saddle flange means affixed to said base member below said pins;
   a curved sheath member of a rubberlike material having an inner surface substantially conforming to the outer curved surface of said base member, and having a plurality of L-shaped slots therein for engaging said pins, and having at least one slot in the lower edge thereof for engaging said saddle flange means; and
   a cap member adapted to be affixed to said base member above and engaging said sheath member for holding said sheath member in engagement with said pins and saddle flange means.

2. A dolphin or bumper for use on marine structures for fending off vessels, comprising:
   a substantially cylindrical base member;
   a plurality of vertically spaced-apart pins affixed to and extending outwardly from said base member;
   a curved sheath member of a rubberlike material having an inner surface substantially conforming to the outer curved surface of said base member, and having a plurality of L-shaped slots therein for engaging said pins; and
   a cap member adapted to be affixed to said base member above and engaging said sheath member for holding said sheath member in engagement with said pins.

3. A dolphin or bumper for use on marine structures for fending off vessels, comprising:
   a substantially cylindrical base member;
   a plurality of vertically spaced-apart pins affixed to and extending outwardly from said base member;
   a curved, semicylindrical sheath member of a rubberlike material having an inner surface substantially conforming to the outer curved surface of said base member, and having a plurality of L-shaped slots therein for engaging said pins; and
   a semicylindrical cap member adapted to be affixed to said base member above and engaging said curved, semicylindrical sheath member for holding said sheath member in engagement with said pin.

4. A fender for use on a marine structure, comprising:
   a vertically disposed, cylindrically shaped member having an outer surface of a rubberlike material;
   connecting means connected to the upper and lower ends of said cylindrically shaped member for hingedly connecting said cylindrically shaped member to said marine structure;
   a plurality of elongated cylindrical members formed of a rubberlike material and having an annular cross section whereby a longitudinal bore extends therethrough; and
   a plurality of cable members individually extending through said elongated cylindrical members and connected to said cylindrically shaped member at the upper and lower ends thereof.

5. A fender for use on a marine structure, comprising:
   a vertical disposed, cylindrically shaped member having an outer surface of a rubberlike material;
   connecting means connected to the upper and lower ends of said cylindrically shaped member for hingedly connecting said cylindrically shaped member to said marine structure;
   a plurality of elongated cylindrical members formed of a rubberlike material and having an annular cross section whereby a longitudinal bore extends therethrough;
   a plurality of cable members individually extending through said elongated cylindrical members; and
   means connected to said connecting means for connection to said cable members to suspend said elongated cylindrical members in spaced relationship around said cylindrically shaped member and substantially parallel to said cylindrically shaped member.

6. A fender for use on a marine structure, comprising:
   a vertically disposed, elongated, cylindrically shaped member having an outer surface of a rubberlike material, for hinged connection to said marine structure;
   a plurality of elongated cylindrical members formed from a rubberlike material and having an annular cross section whereby a longitudinal bore extends therethrough;
   cable means extending through each of said elongated cylindrical members and vertically positioning said each elongated cylindrical member against the exterior of said cylindrically shaped member and substantially parallel thereto, said cylindrically shaped member comprising:
      a substantially cylindrical base member,
      a plurality of vertically spaced-apart pins affixed to and extending outwardly from said base member,
      at least one saddle flange means affixed to said base member below said pins,
      a curved sheath member of a rubberlike material having an inner surface substantially conforming to the outer curved surface of said base member, and having a plurality of L-shaped slots therein for engaging said pins, and having at least one slot in the lower edge thereof for engaging said saddle flange means, and
      a cap member adapted to be affixed to said base member above and engaging said sheath member for holding said sheath member in engagement with said pins and saddle flange means.

7. A fender for use on a marine structure, comprising:
   a vertically disposed, elongated, cylindrically shaped member having an outer surface of a rubberlike material, for hinged connection to said marine structure;
   a plurality of elongated cylindrical members formed from a rubberlike material and having an annular cross section whereby a longitudinal bore extends therethrough;
   cable means extending through each of said elongated cylindrical members and vertically positioning said each elongated cylindrical member against the exterior of said cylindrically shaped member and substantially parallel thereto, said cylindrically shaped member comprising:
      a substantially cylindrical base member,
      a plurality of vertically spaced-apart pins affixed to and extending outwardly from said base member,
      a curved sheath member of a rubberlike material having an inner surface substantially conforming to the outer curved surface of said base member, and having a plurality of L-shaped slots therein for engaging said pins, and
      a cap member adapted to be affixed to said base member above and engaging said sheath member for holding said sheath member in engagement with said pins.

8. A fender for use on a marine structure, comprising:
   a vertically disposed, elongated, cylindrically shaped member having an outer surface of a rubberlike material for hinged connection to said marine structure;

a plurality of elongated cylindrical members formed from a rubberlike material and having an annular cross section whereby a longitudinal bore extends therethrough; and cable means extending through each of said elongated cylindrical members and vertically positioning said each elongated cylindrical member against the exterior of said cylindrically shaped member and substantially parallel thereto, said cylindrically shaped member comprising:

a substantially cylindrical base member, a plurality of vertically spaced-apart pins affixed to and extending outwardly from said base member, a curved, semicylindrical sheath member of a rubberlike material having an inner surface substantially conforming to the outer curved surface of said base member, and having a plurality of L-shaped slots therein for engaging said pins, and a semicylindrical cap member adapted to be affixed to said base member above and engaging said curved, semicylindrical sheath member for holding said sheath member in engagement with said pins.

References Cited

UNITED STATES PATENTS

| | | | |
|---|---|---|---|
| 2,417,849 | 3/1947 | Walters et al. | 114—220 |
| 2,433,569 | 12/1947 | Marchal | 114—219 |
| 3,106,182 | 10/1963 | Burleigh | 114—220 |
| 3,209,545 | 10/1965 | Cook | 61—48 |
| 3,254,491 | 6/1966 | Levington | 61—48 |

FOREIGN PATENTS 541,866   12/1941   Great Britain.

FERGUS S. MIDDLETON, *Primary Examiner.*

MILTON BUCHLER, *Examiner.*

T. W. BUCKMAN, *Assistant Examiner.*